Patented Nov. 24, 1931

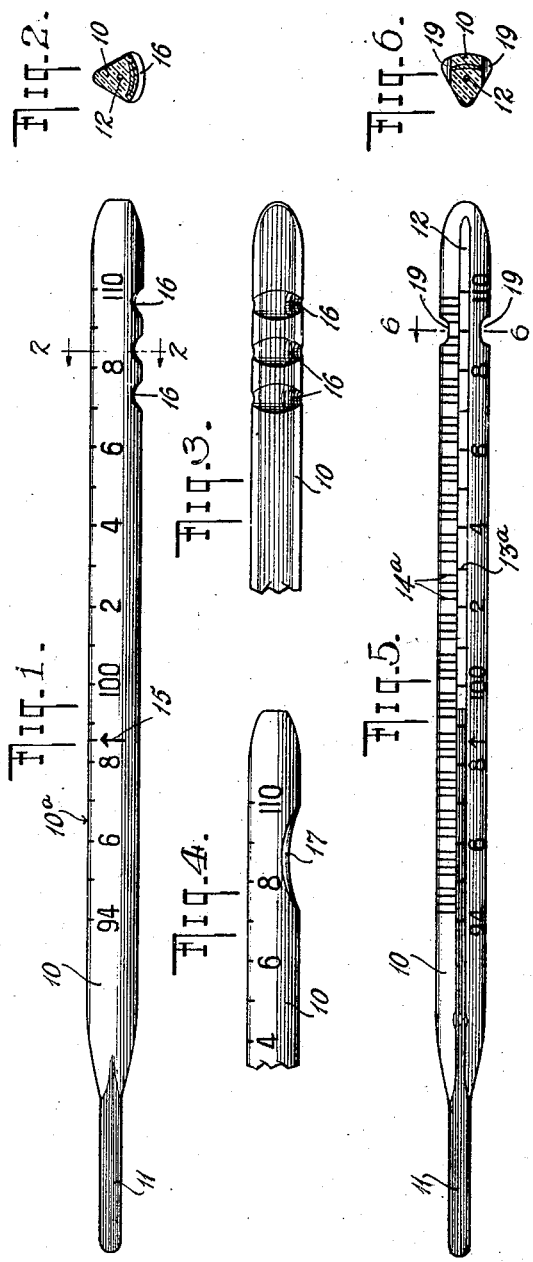

1,833,184

UNITED STATES PATENT OFFICE

RALPH F. SCHNEIDER, OF JERSEY CITY, NEW JERSEY, ASSIGNOR TO MEINECKE & COMPANY, OF NEW YORK, N. Y., A CORPORATION OF NEW JERSEY

CLINICAL THERMOMETER

Application filed May 20, 1930. Serial No. 453,904.

My invention relates to clinical thermometers of the type known as lens front or magnifying front. The tube of thermometers of this type has its cross-section in the form approximating that of an isosceles triangle, the edges, however, being slightly rounded, one of such rounded edges constituting a lens through which the mercury column may be observed in magnified proportions, and is customarily read by holding the thermometer in a horizontal position with the bulb to the left.

When reading this type of thermometer it is necessary to place the edge of the lens portion directly into the plane defined by the mercury column or mercury channel and the lenses of the eyes of the reader, and as the mercury does not become visible to the reader until this relation has been substantially established, the time usually consumed in establishing such relation is much longer than that necessary for reading the old style clinical thermometer whose cross-section is circular and which is not provided with a magnifying portion.

It is the object of my invention to provide means for more readily establishing the proper relationship between the eyes of the reader, the edge forming the lens portion and the mercury column, in the lens front in a thermometer of the lens front type.

My invention contemplates primarily a new arrangement of the graduation marks on, and/or in the vicinity of, the lens portion of the thermometer; and, secondarily, as a further but not essential aid, the provision of grooves in one or more of the faces of the thermometer tube which will enable the reader to call into service his tactile sense in order to establish the proper reading relationship.

My invention is illustrated by way of example but not by way of limitation in the accompanying drawings in which Fig. 1 is a side view of a thermometer provided with three grooves; Fig. 2 is a section on the line 2—2 of Fig. 1; Fig. 3 is a fragmentary view showing the bottom portion of the thermometer shown in Fig. 1; Fig. 4 is a fragmentary view showing the right-hand portion of a thermometer provided with a single groove; Fig. 5 is a front view of a thermometer provided with two grooves, one at the bottom edge of each side, and with forms of graduation marks embodying my invention; and Fig. 6 is a cross-section along the line 6—6 of Fig. 5.

In the drawings, 10 represents a thermometer tube of the lens front type having a lens or magnifying front 10a and provided with the usual bulb 11 and mercury channel 12. The graduation marks forming the usual thermometer scale comprise marks 13a indicating full degrees and marks 14a indicating fractions of a degree, the mark 15 indicating the normal temperature of 98.6°, and the usual Arabic numerals indicating the cardinals of alternate full degree marks. Each of the lines constituting the full degree marks 13a extends only from the upper to the lower edge of the channel 12. When speaking of the "edges" of the channel 12 or of the relation of the graduation marks thereto, I refer to the edges as they are visible to the reader's eye, through the magnifying front 10a, and to the graduation marks as visible to the reader's eye with relation to such edges as thus seen. Each of the lines 14a, indicating the fractions of a degree, extends from a point well above the mercury channel 12 to a point where such line meets the upper edge of such channel and does not extend below such edge. The line 15 indicating the normal temperature extends across the channel 12 and stops at the lower edge of such channel.

As the lower ends of the fractional degree marks 14a lie in the line defining the upper edge of the channel 12, and the lower ends of the full degree marks 13a lie in the line defining the lower edge of such channel, these two groups of marks give a clear indication to the reader where the channel is to be found, i. e., how he is to hold the thermometer in order to obtain a view of the mercury column through the lens portion 10a; in other words, the lower ends of the lines as arranged in accordance with my invention define lines corresponding to the upper and lower edges of the mercury channel and thus constitute a mercury column finder. As the mercury channel in thermometers of the lens front type is located in a plane bisecting the dihedral angle formed by the magnifying portion 10a, all that the reader has to do is to hold the thermometer so as to place his eyes as nearly as he can calculate into this bisecting plane and then to rotate the thermometer slightly, being guided by the ends of the two groups of lines referred to. Furthermore, in this manner of marking thermometers, the full degree lines and the fractional lines can both be read at the same time without turning the thermometer, the latter procedure being necessary with thermometers having the old style markings.

By arranging the full degree marks 13a in the manner just described, that is, so that no portion of such marks extends above the upper edge of the mercury channel, there is provided an unmarked space between each group of fractional degree marks which is larger than the space between two fractional degree marks. This enlarged space makes it easier to read the fractions of a degree, but this feature is not claimed in the present application as it forms the subject-matter of a separate application, Serial Number 446,806, filed April 24, 1930. Furthermore, the extension of the full degree lines across the mercury channel brings the lower ends of these lines close to the Arabic numerals, and the full degrees are therefore more readily and more accurately read.

The additional feature of my invention hereinabove referred to, namely the provision of grooves, while not essential to the operation of the invention just described, is of value in connection therewith to persons, such as nurses, who have frequent occasion to use a clinical thermometer. Figs. 1 and 3 show three grooves 16 provided on the back of the thermometer, preferably near the right-hand end thereof, such grooves being shown in side view in Fig. 1. Fig. 2, which is a cross-section on line 2—2 of Fig. 1 shows the lower portion of one of these grooves. A frequent user of a clinical thermometer who will so hold the thermometer that at least one of his fingers comes into contact with one or more of the grooves, will soon train his tactile sense so that he will immediately present the thermometer to his eyes in approximately the proper reading position. Instead of a plurality of grooves, a single groove such as 17, Fig. 4 located in the back, may be employed. The grooves may be arranged on any desired portion of the thermometer, of course always preferably near the right-hand end thereof, and also preferably on the bottom side, as shown in Fig. 3 so that they may not interfere with the markings. For instance, as indicated in Fig. 5, one or more grooves 19 may be cut along one or both of the sides of the thermometer at the bottom edges. If desired, grooves may be cut both along the back and the side, or the side and the front, in any position in which they may serve the intended purpose.

A further advantage of providing a groove near the right-hand end of a lens front thermometer, whether or not provided with the markings hereinabove described, is that it will prevent slipping and consequent liability to break the thermometer when the same is flipped vigorously to shake down the mercury in channel 12 back into bulb 11.

Various changes in the specific forms shown and described may be made within the scope of the claims without departing from the spirit of my invention. Thus, it is not necessary that all of the fractional degree marks 14a should end at the upper edge of the channel 12 as one or more of them may be carried over to the lower edge of such channel and thus add to the number of points defining such lower edge; nor is it necessary that every graduation mark should end at one of the edges of the channel as long as a sufficient number of such marks end at one edge of the channel and a sufficient number end at the other edge of the channel in order to outline such channel to a degree useful for rapid finding of the mercury column. Of course, the arrangement of the graduation marks may be reversed, i. e. the fractional degree marks may be arranged below the lower edge of the mercury channel instead of above the upper edge as shown in the drawings, or the arrangement may be that shown in my Letters Patent No. 994,482, dated June 6, 1911.

Obviously some of the advantages of my invention would be secured if the ends of the marks did not extend exactly to, or slightly beyond, the edge or edges which they would define if accurately made, especially if all the marks whose inner ends would define an edge if accurately made extended to within the same distance of such edge. In the manufacture of lens front thermometers on a large scale it would not always be feasible to have the edges exactly defined as the thermometers are not made exactly alike and, more particularly, their lens front portions would not magnify the mercury columns to exactly the same degree in each thermometer. A slight variation or inaccuracy in defining the edge may therefore be expected in large scale manufacturing operation. I therefore desire it to be understood that such a variation from the structure defined in the claims would not remove the resulting thermometer from the ambit of such claims.

When I speak in my claims of the "magnified mercury channel" I refer to the channel as it appears when viewed through the lens front.

I claim:

1. As an article of manufacture a clinical thermometer of the lens front type in which marks indicating full degrees extend from but not beyond one of the edges of the magnified mercury channel to but not beyond the other edge of the magnified mercury channel and marks indicating fractions of a degree extend from one side of the thermometer to but not beyond one of the edges of such mercury channel, so that the ends of such marks define between them the location of such mercury channel.

2. As an article of manufacture a clinical thermometer of the lens front type provided with a cross-wise groove in one of its faces adapted to serve as a finger grip when the thermometer is shaken.

RALPH F. SCHNEIDER.